May 27, 1969  PAUL-FRIEDRICH FÖRSTER ET AL  3,446,772
PROCESS FOR PREPARING HIGH MOLECULAR WEIGHT POLYALKYLENE
TEREPHTHALATES BY INTIMATELY MIXING A MOLTEN STREAM OF
LOW MOLECULAR WEIGHT POLYALKYLENE TEREPHTHALATE
WITH A MELT OF HIGHER MOLECULAR WEIGHT
POLYALKYLENE TEREPHTHALATE
Filed July 29, 1965

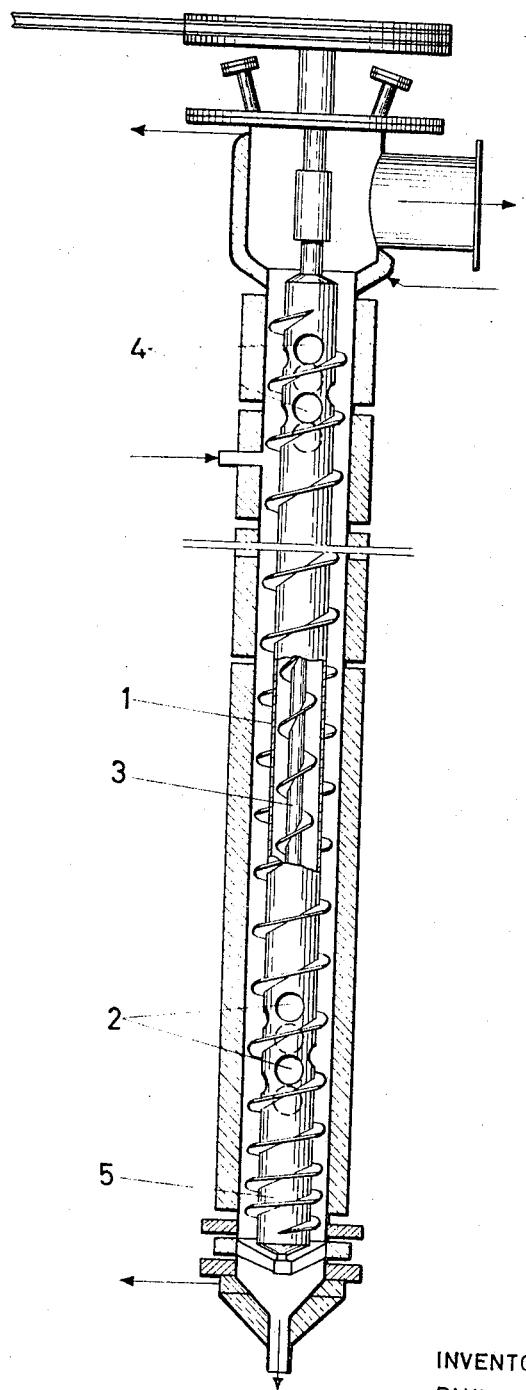

INVENTORS
PAUL-FRIEDRICH FÖRSTER
HERBERT KURZKE
HELMUT SATTLER
GÜNTHER SCHNOCK
BY
their ATTORNEYS United States Patent Office 3,446,772
Patented May 27, 1969

3,446,772
PROCESS FOR PREPARING HIGH MOLECULAR WEIGHT POLYALKYLENE TEREPHTHALATES BY INTIMATELY MIXING A MOLTEN STREAM OF LOW MOLECULAR WEIGHT POLYALKYLENE TEREPHTHALATE WITH A MELT OF HIGHER MOLECULAR WEIGHT POLYALKYLENE TEREPHTHALATE
Paul-Friedrich Förster, Herbert Kurzke, Helmut Sattler, and Günther Schnock, Bobingen, Germany, assignors to Farbwerke Hoechst Aktiengesellschaft vormals Meister Lucius & Bruning, Frankfurt am Main, Germany, a corporation of Germany
Filed July 29, 1965, Ser. No. 475,661
Claims priority, application Germany, Aug. 8, 1964, F 43,701
Int. Cl. C08g 39/04, 53/18
U.S. Cl. 260—47               1 Claim

ABSTRACT OF THE DISCLOSURE

Production of polyalkylene terephthalate of high molecular weight and shaped structures made therefrom comprising polycondensing a low molecular weight polyalkylene terephthalate by intimately and rapidly mixing a molten polyalkylene terephthalate having a specific viscosity between 0.2 and 0.85 with a melt of polyalkylene terephthalate of higher molecular weight in a reaction zone maintained under reduced pressure and at a temperature between 260 and 310° C. and withdrawing the resulting mixture from the reaction zone after a residence time between 10 minutes and 15 hours.

---

The present invention relates to a process for preparing polyalkylene terephthalates and shaped structures made therefrom.

It is known to prepare polyalkylene terephthalates by polycondensing a bis-(hydroxyalkyl)-terephthalate at a temperature within the range of 260° C. to about 310° C. The melt of polycondensation product leaves the condensation vessel in the form of a strand or ribbon. It is then passed through a cooling liquid and granulated. The granulated product is conveyed to the place where the shaped structures are to be produced. Here the granules are dried, melted with the exclusion of moisture and forced through nozzles whereby they are formed to yield the desired shaped structures. In the course of the various processing operations the molecular weight of the polyester changes in an undesired manner by hydrolytic and thermal degradation. The degree of degradation depends to a large extent on the drying conditions and many efforts are necessary to keep it constant. Variations in the degree of polycondensation are particularly troublesome in products that have a very high degree of polycondensation.

It is a little more advantageous to apply processes in which the polycondensation product is prepared continuously and conveyed in the form of a melt to the shaping devices where it is immediately transformed into the desired shaped structures. In this mode of operating the steps of discharging, cooling, disintegrating, drying and again melting the product are dispensed with.

However, in all the known processes for the continuous preparation of polyalkylene terephthalate the course of the reaction has to be controlled very exactly in each of the apparatus used for the individual reaction stages. Even very slight variations of the average residence time, the temperature, the reduced pressure and the other reaction conditions lead to inadmissible variations of the average degree of polycondensation and thereby impair the qualities of the shaped structures formed from the melt. If in the known continuous polycondensation processes the desired uniform average molecular weight is to be obtained the residence time of the individual polyester particles has to be as identical as possible with the average residence time of the mass in the apparatus. Consequently care has to be taken that during the condensation polyesters having different degrees of polycondensation do not mix with one another. For this purpose very complicated apparatus are used, for example, cascadelike devices, polycondensation apparatus consisting of several series-connected parts or conveying means arranged within the polycondensation apparatus and serving simultaneously to prevent an intermixing of polyesters of different degrees of polycondensation to as large an extent as possible and to bring about a frequent renewal of the surface of polyesters having the same degree of polycondensation. The apparatus complying with these requirements are very large and their operation is no longer economical. In the known continuous polycondensation processes it is particularly disadvantageous that the parts of the apparatus which in the direction of flow of production are at the beginning are filled with polyalkylene terephthalates of very low molecular weight which contain relatively large quantities of bis-(hydroxyalkyl)-terephthalates.

Under the conditions of pressure and temperature which have to be applied in the polycondensation the bis-(hydroxyalkyl)-terephthalate very readily clogs parts of the apparatus and pipes owing to its high volatility and thus gives rise to difficulties which can only be prevented by expensive measures.

Now we have found that polyalkylene terephthalates of high molecular weight and shaped structures made therefrom, for example, fibers, filaments, films and sheets, can advantageously be prepared by the polycondensation of polyalkylene terephthalates of low molecular weight at a temperature within the range of 260° to 310° C. by conveying a continuous stream of molten polyalkylene terephthalate having a specific viscosity ($\eta$ spec.) within the range of 0.2 to 0.85 to a melt of polyalkylene terephthalate of higher molecular weight, which is kept under reduced pressure and violently agitated, by mixing the two portions of molten material immediately and completely and by continuously forcing the mixture through nozzles after an average residence time within the range of 10 minutes to 15 hours in the reaction chamber and thereby transforming it into shaped structures.

By polyalkylene tertphthalates are here to be understood polyesters wherein the acid component is terephthalic acid or a mixture of terephthalic acid and isophthalic acid, 4:4′-diphenyl dicarboxylic acid, hexahydro terephthalic acid, adipic acid, sebacic acid, naphthalene dicarboxylic acids, 2:5-dimethyl terephthalic acid, 5-sulpho-isophthalic acid or bis-p-carboxyphenoxyethane, and which as the alcohol component contain a diol having 2 to 10 carbon atoms, for example, an aliphatic diol such as ethylene glycol, butane diol or propylene glycol, an aromatic diol such as p-xylylene glycol or a cycloaliphatic diol such as cyclobutane diol or 1:4-dimethylol cyclohexane. There are preferably prepared polyesters which as the acid component contain more than 75% of terephthalic acid.

The polyalkylene terephthalates used as starting products contain the catalysts which have been described, for example, in J. Polymer. Sci., vol. 54, p. 388 (1961), in a concentration with the range of 0.001 to 0.1%.

The specific viscosity ($\eta$ spec) of the low molecular weight starting products is within the range of 0.20 to 0.85, preferably 0.40 to 0.85. The polyalkylene terephthalates of higher molecular weight have a specific viscosity (η spec) within the range of 0.40 to 2, the difference between the viscosity of the low molecular weight polyalkylene terephthalate and that of the polyalkylene terephthalate of higher molecular weight being at least 0.2.

As has already been mentioned above, in continuous processes the starting products of low molecular weight have hitherto always been prevented from mixing with the final polycondensation product. In contradistinction thereto, in the process according to the present invention polyalkylene terephthalates of low molecular weight and those of higher molecular weight are mixed homogeneously. When the products are mixed immediately and completely at the place where the continuous stream of the polyalkylene terephthalate of low molecular weight enters the melt of the polyalkylene terephthalate of higher molecular weight, the average statistic equilibrium of the molecular weights adjusts very quickly. The mixture thus obtained is kept in the molten state under reduced pressure, so that the glycol set free during the reaction can be quickly removed. In order that the reaction takes place uniformly in all parts of the mixture it is necessary that new constituents of the mixture are constantly brought to the surface and exposed to the reduced pressure, so that there is only a short way of diffusion for the gases and vapours to be drawn off. The degree of polycondensation of the mixture of polyalkylene terephthalates that is continuously discharged depends on the degree of polycondensation of the polyalkylene terephthalate used, on the average residence time of the melt in the reactor under the conditions required according to the invention, on the reduced pressure applied and on the speed at which the surface of the molten mass is renewed in the apparatus. The degree of polycondensation corresponds to a specific viscosity (η spec) of 0.40 to 2.0.

As apparatus that are suitable for use in carrying out the process of the invention there may be mentioned vessels provided with stirring means, which enable a frequent renewal of the surface and a good mixing of the melt to be brought about.

The process according to the invention enables high molecular weight polyalkylene terephthalates of a very constant average degree of polymerization to be prepared in a simple manner.

The following examples serve to illustrate the invention but they are not intended to limit it thereto, the accompanying drawing to which the examples refer being given by way of example only.

EXAMPLE 1

A continuous stream of molten polyalkylene terephthalate of a specific viscosity of 0.320 (measured at 25° C. in a solution of 1% strength of the polycondensation product in a mixture of 60 parts of phenol and 40 parts of tetrachloroethane in an Ubbelohde viscometer) was metered into a condensation reactor as shown in the accompanying drawing. The reactor had a length of 100 cm. and a diameter of 10 cm. and was provided with a double screw stirrer. An external hollow screw 1 pressed the melt downwards. At about 20 cm. above the lower end of the hollow screw the melt penetrated through bore-holes 2 into the interior of the hollow screw and was conveyed upwards by a stationary screw 3. At the upper end of this screw 3 the melt left it through bore-holes 4 and was again conveyed downwards by exterior hollow screw 1. In this way the melt was continuously recycled. The lowermost part 5 of the hollow screw acted as a pressing pump conveying the material in the direction of a gear pump arranged at the bottom of the reactor and serving to continuously discharge the melt, the melt being then shaped in known manner to form filaments. The number of revolutions of the screw stirrer may vary within wide limits. It is limited on the one hand by insufficient mixing and on the other hand by an over-heating of the melt produced by the stirrer. At an output of 17 grams per minute, a reaction temperature of 275° C., a pressure of 1 mm. of mercury and a speed of the stirrer of 50 revolutions per minute filaments were obtained which had a specific viscosity of 0.630.

EXAMPLE 2

Molten polyethylene terephthalate having a specific viscosity (η spec) of 0.56 was continuously introduced into the reactor described in Example 1. At a speed of the stirrer of 71 revolutions per minute, a temperature of the melt of 277° C., a pressure of 0.4 mm. of mercury and an output of 40 grams per minute filaments were obtained which had a specific viscosity of 0.84.

EXAMPLE 3

When a polyethylene terephthalate of a specific viscosity (η spec.) of 0.84 was used and the reaction was carried out at a temperature of 280° C. under a pressure of 0.1 mm. of mercury, at a speed of the stirrer of 27 revolutions per minute and with an average residence time of 4 hours a polyester melt was obtained which upon being discharged had a specific viscosity of 1.37.

What we claim is:

1. A process for the production of high molecular weight polyalkylene terephthalates wherein the acid component is terephthalic acid or a mixture of terephthalic acid with an acid selected from the group consisting of isophthalic acid, 4:4'-diphenyl dicarboxylic acid, hexahydro terephthalic acid, adipic acid, sebacic acid, naphthalene dicarboxylic acids, 2:5-dimethyl terephthalic acid, 5-sulpho-isophthalic acid or bis-p-carboxyphenoxyethane and the alcohol component is a diol having 2 to 10 carbon atoms, comprising polycondensing low molecular weight polyalkylene terephthalate by intimately and rapidly mixing a continuous stream of said polyalkylene terephthalate in a molten state having a specific viscosity between 0.2 and 0.85 with a melt of said polyalkylene terephthalate of higher molecular weight having a specific viscosity between 0.4 and 2, the difference between the specific viscosity of the low molecular weight and the high molecular weight polyalkylene terephthalate being at least 0.2 in a reaction zone maintained under reduced pressure and at a temperature of between 260 and 310° C. and withdrawing the resulting mixture from the reaction zone after a residence time of the mixture in the reaction zone of between 10 minutes and 15 hours and a degree of polycondensation in said reaction zone corresponding to a specific viscosity of 0.40 to 2.0, the specific viscosities being measured at 25° C. in a solution of 1% strength of the polyalkylene terephthalate in a mixture of 60 parts of phenol and 40 parts of tetrachloroethane in an Ubbelohde viscometer.

References Cited

UNITED STATES PATENTS 3,337,508   8/1967   Bachmann et al.
2,758,915   8/1956   Vodonik.

WILLIAM H. SHORT, *Primary Examiner.*

L. P. QUAST, *Assistant Examiner.*

U.S. Cl. X.R.

260—75